(12) United States Patent
Kain et al.

(10) Patent No.: US 7,434,878 B2
(45) Date of Patent: Oct. 14, 2008

(54) JUVENILE VEHICLE SEAT WITH MOVABLE SHIELD

(75) Inventors: James M. Kain, Troy, OH (US); Jason A. Crowell, Columbus, IN (US); William Horton, Hope, IN (US); Steven Oltman, Hope, IN (US)

(73) Assignee: Cosco Management, Inc., Wilmington, DE (US)

( * ) Notice: Subject to any disclaimer, the term of this patent is extended or adjusted under 35 U.S.C. 154(b) by 368 days.

(21) Appl. No.: 11/246,782

(22) Filed: Oct. 7, 2005

(65) Prior Publication Data

US 2007/0080569 A1  Apr. 12, 2007

(51) Int. Cl.
  *B60N 2/26* (2006.01)

(52) U.S. Cl. .................................. 297/256.15

(58) Field of Classification Search ............. 297/256.15, 297/250.1, 488, 487, 467
See application file for complete search history.

(56) References Cited

U.S. PATENT DOCUMENTS

| 4,662,683 A | * | 5/1987 | Knoedler et al. ............. 297/488 |
| 4,729,600 A | * | 3/1988 | Single et al. ............ 297/256.13 |
| 5,538,322 A | | 7/1996 | Cone et al. |
| 5,664,833 A | * | 9/1997 | Celestina-Krevh et al. ....... 297/256.15 |
| 5,690,382 A | * | 11/1997 | Cone ..................... 297/256.15 |
| 5,816,652 A | | 10/1998 | Cone et al. |
| 6,068,335 A | | 5/2000 | Glover |

\* cited by examiner

*Primary Examiner*—Milton Nelson, Jr.
(74) *Attorney, Agent, or Firm*—Barnes & Thornburg LLP (57) ABSTRACT

A juvenile vehicle seat includes a seat bottom, a seat back, a pivotable shield, and a juvenile-restraint harness. The shield includes a barrier coupled to the juvenile-restraint harness.

30 Claims, 5 Drawing Sheets

JUVENILE VEHICLE SEAT WITH MOVABLE SHIELD

BACKGROUND

The present disclosure relates to juvenile vehicle seats, and, in particular, to juvenile vehicle seats having restraint systems. More particularly, the present disclosure relates to a juvenile vehicle seat with a barrier shield positioned in front of a child seated in the juvenile vehicle seat.

SUMMARY

A juvenile vehicle seat in accordance with the present disclosure includes a seat bottom, a seat back, and a pivotable shield movable about a pivot axis relative to the seat bottom between raised and lowered positions. A juvenile-restraint harness is coupled to the shield and to the seat bottom and back and arranged to cooperate with the shield in its lowered position to restrain a juvenile seated on the seat bottom.

In illustrative embodiments, a compressible shield lifter is carried on the shield. The compressible shield lifter is configured to apply a lifting force to urge the shield away from the seat bottom upon movement of the shield to the lowered position so that a lifting force is applied by the shield to a crotch belt included in the juvenile-restraint harness to tension the crotch belt. In an illustrative embodiment, a two-piece buckle is included in the crotch belt and the lifting force applied by the shield tensions the buckle. Also in an illustrative embodiment, the compressible shield lifter aids a caregiver in moving the shield to the raised position relative to the seat bottom after the buckle has been "released" owing, in part, to a lifting force applied to shield by the compressible shield lifter.

Also in illustrative embodiments, the shield includes a barrier arranged to interconnect left and right swing arms mounted to the seat back for pivotable movement to establish the raised and lowered positions. The barrier includes an upper shell coupled to a lower shell to form a hollow interior region. The lower shell is coupled to the crotch belt at a harness mount. The upper shell includes a top wall including an unsupported thin-walled section located above the harness mount formed in the lower shell.

Additional features of the disclosure will become apparent to those skilled in the art upon consideration of the following detailed description of preferred embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
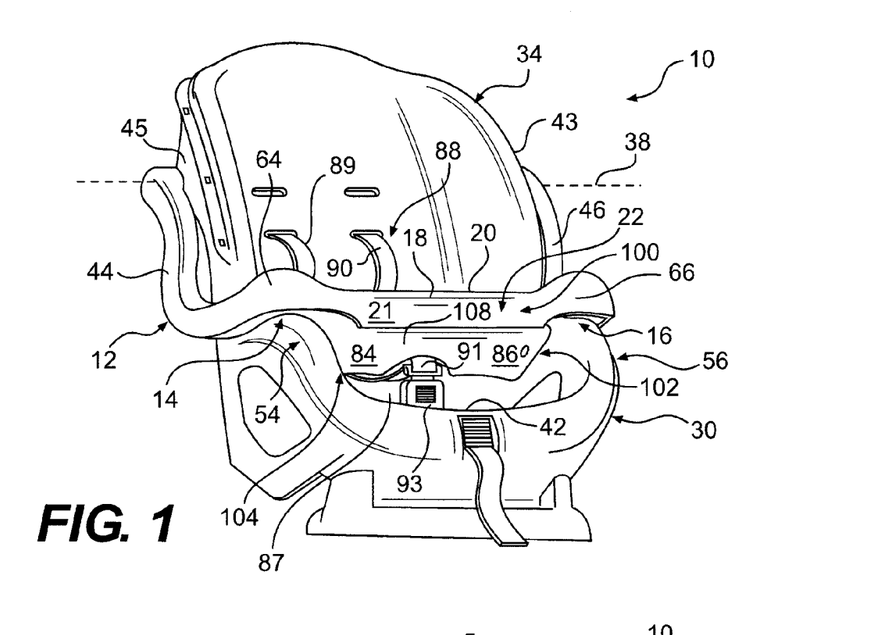
FIG. 1 is a perspective view of a juvenile vehicle seat in accordance with the present disclosure showing a shield mounted for pivotable movement on a seat back about a horizontal axis and moved to assume a lowered position above a seating portion provided on a seat bottom.
Figure 6:
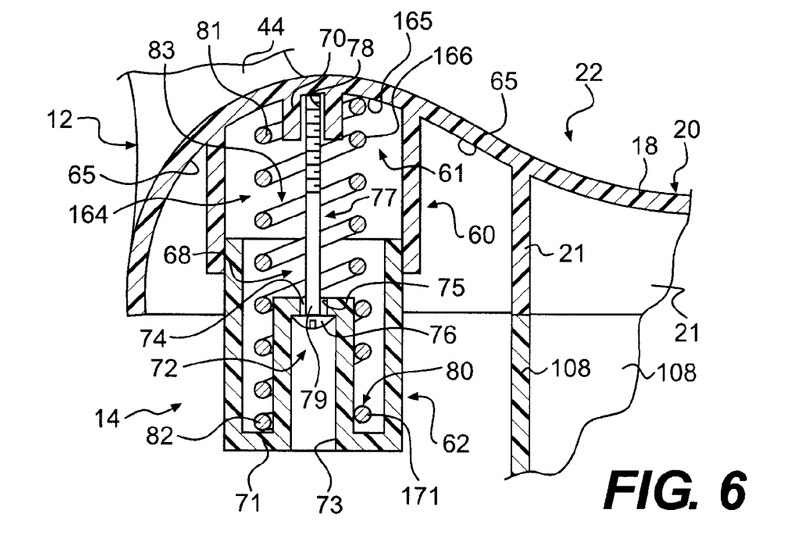
FIG. 6 is an enlarged sectional view taken along line 6-6 of FIG. 5 showing a spring-loaded movable pad telescopically received in a pad receiver carried on the shield to define the compressible shield lifter associated with the right swing arm.
Figure 7:
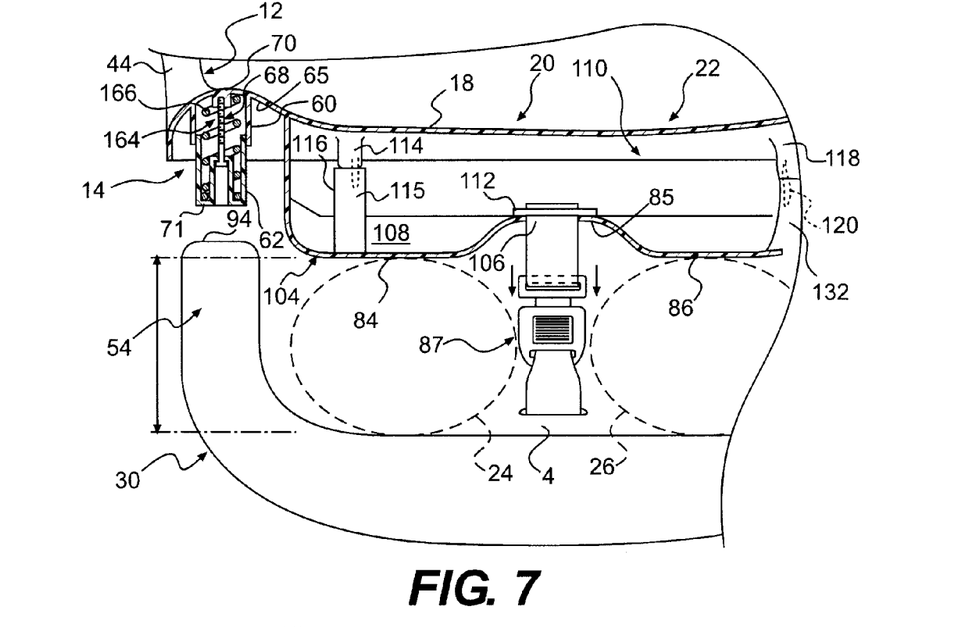
FIG. 7 is an enlarged sectional view taken along line 7-7 of FIG. 5 showing (1) the shield in a position just above the lowered position, (2) an unsupported thin-walled section that is included in a top wall of the upper shell and located above the harness mount, (3) the crotch belt retainer plate coupled to the upper strap of the crotch belt and arranged to engage an interior surface of the harness mount, and (4) the left and right thigh-restraint surfaces formed in the lower shell of the barrier in engagement with the left and right thighs (shown in phantom) of a "larger" juvenile seated on the seat bottom.
Figure 8:
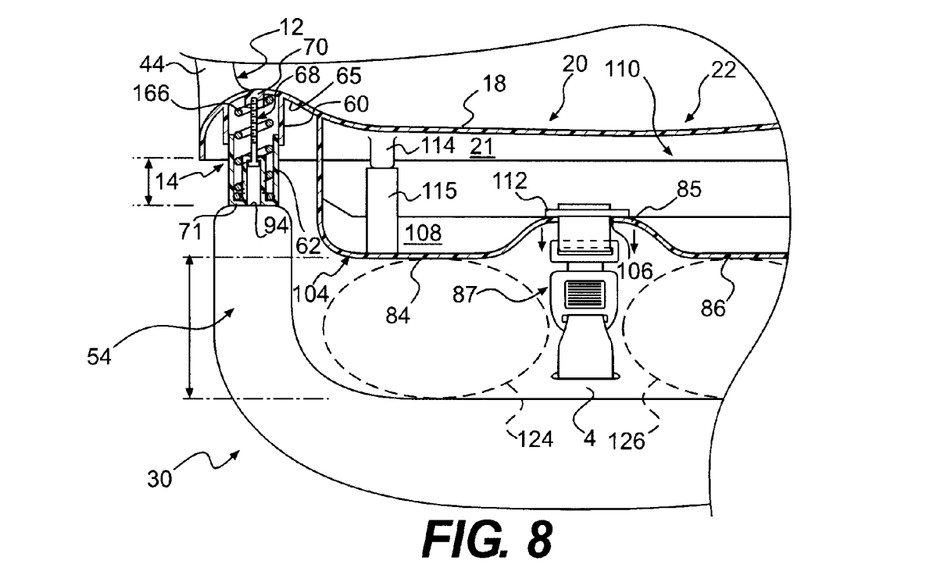
FIG. 8 is a sectional view similar to FIG. 7 showing the shield in the lowered position to illustrate partial compression of a pad mover spring included in the compressible shield lifter when the shield is used to restrain a relatively "smaller" juvenile seated on the seat bottom.
Figure 9:
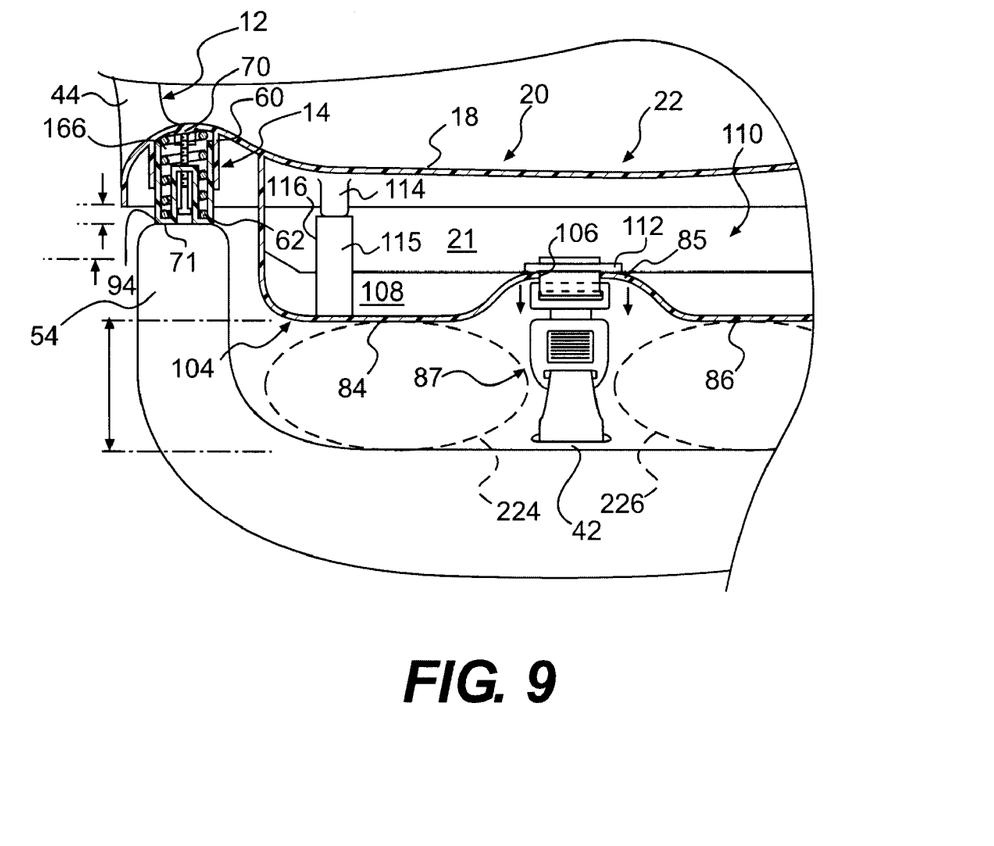
FIG. 9 is another sectional view similar to FIGS. 7 and 8 illustrating nearly full compression of the pad mover spring included in the compressible shield lifter.

A juvenile vehicle seat 10 in accordance with the present disclosure includes a pivotable shield 12 that is adapted to restrain juveniles of different sizes as suggested in FIGS. 1, 7, and 8. Right and left shield lifter units 14, 16 are carried on shield 12 as shown, for example, in FIGS. 2 and 6-9. Shield 12 also includes an unsupported thin-walled section 18 in a top wall 20 of a hollow barrier 22, which barrier 22 is arranged to embrace and restrain right and left thighs 24, 26 of a juvenile occupying seat 10 as shown, for example, in FIG. 7.

Figure 2:
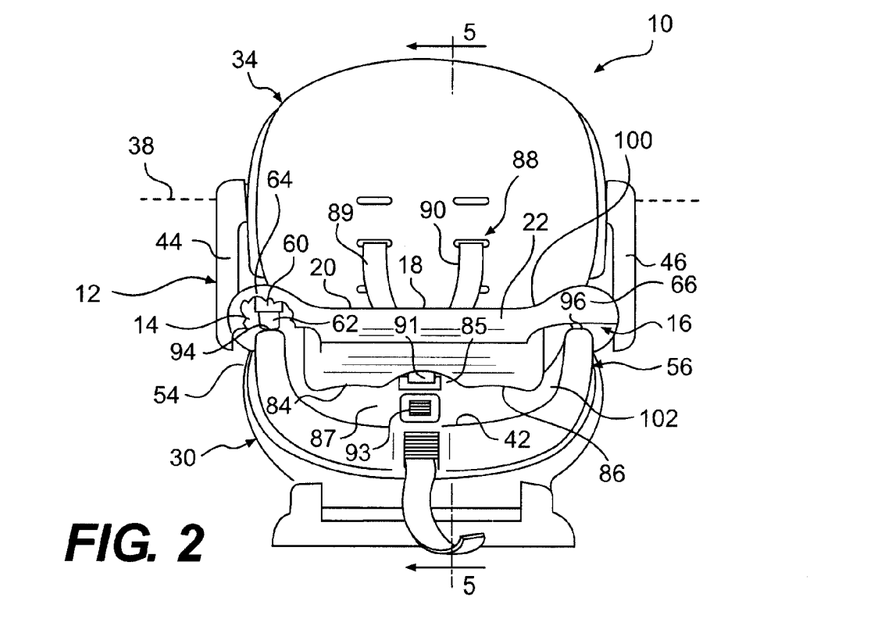
FIG. 2 is a front elevation view of the seat of FIG. 1 showing (1) spaced-apart, downwardly facing, concave, left and right thigh-restraint surfaces provided on a lower shell in a barrier included in the shield and arranged to extend between left and right swing arms also included in the shield, (2) a portion of the right swing arm broken away to reveal a compressible shield lifter carried on the shield and arranged to engage an upwardly extending right shield support included in the seat bottom, and (3) a juvenile-restraint harness including a crotch belt and a pair of shoulder straps.
Figure 3:
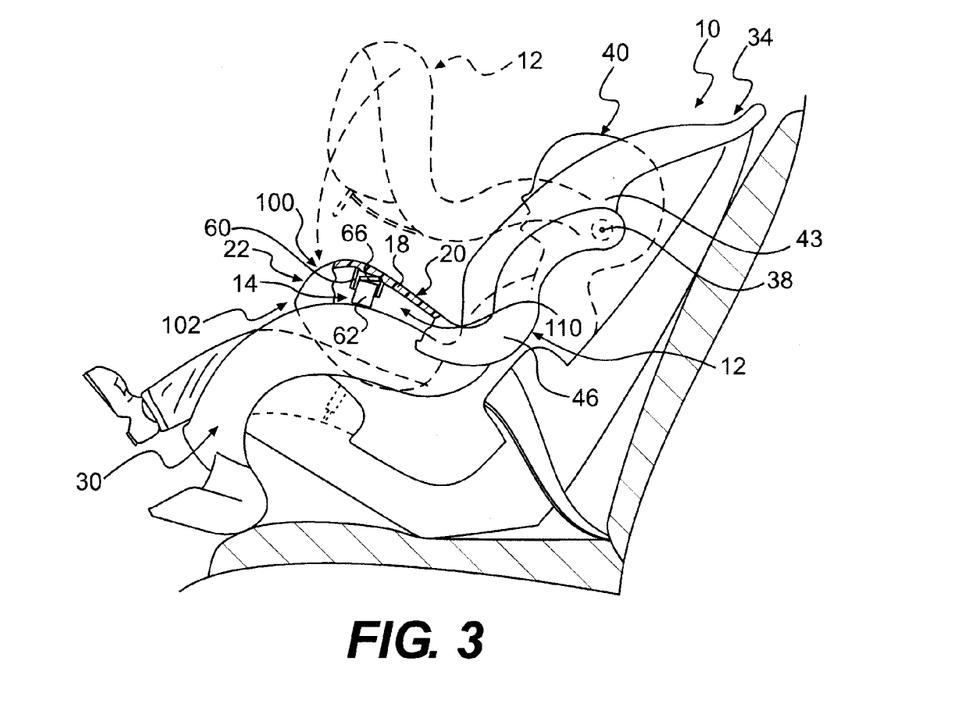
FIG. 3 is a side elevation view of the seat of FIGS. 1 and 2, with portions broken away, showing the compressible shield lifter and showing, in phantom, location of the pivotable shield in a raised position.

Juvenile vehicle seat 10 includes a seat bottom 30, a seat back 34 arranged to extend upwardly from seat bottom 30 and to cooperate with seat bottom 30 to provide a seating surface for a juvenile, and pivotable shield 12 as shown, for example, in FIGS. 1 and 2. Shield 12 is mounted on seat back 34 for pivotable movement about an axis 38 as shown in FIG. 3 from a raised position (in phantom) to allow a juvenile 40 to access the seating surface and a lowered position (in solid) to retain a juvenile 40 contacting the seating surface in a seated position on seat bottom 30.

Figure 4:
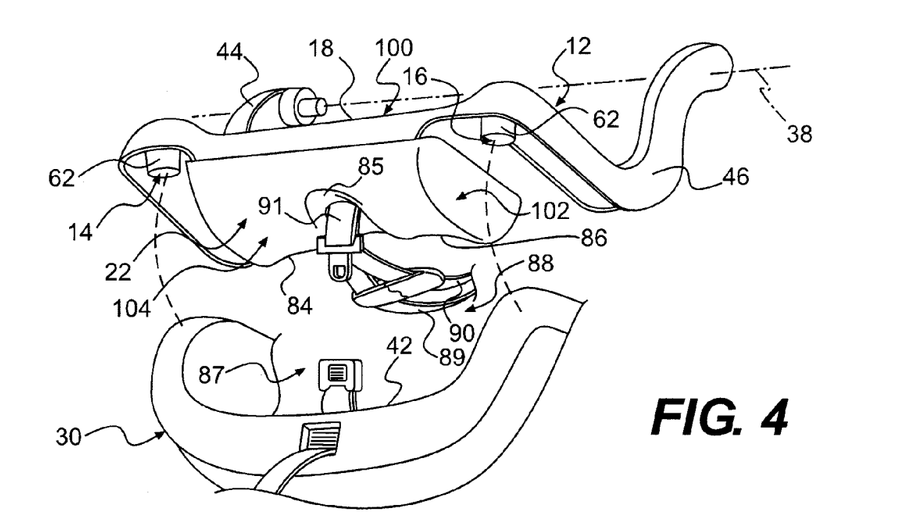
FIG. 4 is an enlarged perspective view showing the juvenile-restraint harness coupled to a harness mount that is included in the lower shell in the barrier of FIGS. 1-3 and located between the concave left and right thigh-restraint surfaces and showing an "unbuckled" belt buckle included in a crotch belt, the crotch belt having an upper strap coupled to the pair of shoulder straps and arranged to extend into a belt-receiver slot formed in the harness mount and terminate at a buckle plate and a lower strap coupled to the seat bottom and configured to terminate at a buckle socket adapted to receive and mate with the buckle plate as suggested in FIG. 2.

Shield 12 includes a left swing arm 46 pivotably coupled to a left side 43 of seat back 34, a right swing arm 44 pivotably coupled to a right side 45 of seat back 34, and a barrier 22 arranged to interconnect right and left swing arms 44, 46 as shown, for example, in FIGS. 1, 2, and 4. Barrier 22 is arranged to lie above a portion 42 of the seating surface included in seat bottom 30 upon movement of shield 12 to assume the lowered position.

Shield 12 also includes a compressible shield lifter carried on shield 12 and arranged to engage seat bottom 30 upon movement of shield 12 to assume the lowered position as shown in FIG. 2. In the illustrated embodiment, the compressible shield lifter is embodied by right and left shield lifter units 14, 16. It is within the scope of this disclosure to use only one shield lifter unit.

Seat bottom 30 includes right and left shield supports 54, 56 arranged to lie in spaced-apart relation to one another to locate portion 42 of the seating surface included in seat bottom 30 therebetween. Each of right and left shield supports 54, 56 is arranged to extend upwardly away from portion 42 of the seating surface in seat 10. Each of shield lifter units 14, 16 is arranged to engage one of left and right shield supports 54, 56 upon movement of shield 12 to assume the lowered position as suggested, for example, in FIGS. 1 and 2.

As shown best in FIG. 6, right shield lifter unit 14 includes a pad receiver 60 coupled to shield 12, a movable pad 62 mounted on pad receiver 60 for movement toward and away from shield 12. Movable pad 62 of right shield lifter unit 14 is arranged to engage right shield support 54 on seat bottom 30 upon movement of shield 12 to assume the lowered position. Right shield lifter unit 14 also includes a cushion system 164 interposed between pad receiver 60 and movable pad 62. Pad receiver 60 is formed to include a downwardly opening interior region 61 and movable pad 62 is telescopically received in downwardly opening interior region 61. Pad receiver 60 and movable pad 62 are arranged to remain in mating engagement with one another during relative motion of movable pad 62 and pad receiver 60. Left shield lifter unit 16 has the same configuration as right shield lifter unit 14 in the illustrated embodiment.

In an illustrative embodiment, shield 12 includes a right elbow shell 64 arranged to interconnect a right side of hollow barrier 22 and right swing arm 44 as shown in FIGS. 1, 2, and 6. Similarly, shield 12 includes a left elbow shell 66 arranged to interconnect a left side of hollow barrier 22 and left swing arm 46. Each of right and left elbow shells 64, 66 includes a downwardly facing interior surface 65. Pad mount 60 of right shield lifter unit 14 is coupled to interior surface 65 of right elbow shell 64 as shown in FIG. 6. Pad mount 60 of left shield lifter unit 16 is coupled to interior surface 65 of left elbow shell 66.

Cushion system 164 includes a spring 166 and a pad tether 68 as shown in FIG. 6. Pad tether 68 is coupled to shield 12 and to movable pad 62 and is configured to limit movement of movable pad 62 relative to shield 12 and to pad receiver 60 to a maximum extended position as shown, for example, in FIG. 6. Spring 166 is interposed between shield 12 and movable pad 62 and arranged yieldably to urge movable pad 62 normally to the maximum extended position.

Shield 12 includes a tether anchor 70 arranged to lie in spaced-apart relation to movable pad 62 as shown, for example, in FIG. 6. The tether anchor 70 associated with right shield lifter unit 14 is coupled to a portion 165 of interior surface 65 located inside pad retainer 60 as shown in FIG. 6.

Movable pad 62, as shown in FIG. 6, is formed to include a bottom wall 71, a head-motion channel 72 having an opening 73 in bottom wall 71, and a tether guide 74 located between bottom wall 71 and tether anchor 70 and formed to include a tether-receiver aperture 75. Pad tether 68 includes an enlarged head 76 lying in head-motion channel 72 and a shank 77 extending through tether-receiver aperture 75 and having one end 78 fixed to tether anchor 70 and another end 79 coupled to enlarged head 76. Tether guide 74 contacts enlarged head 76 to establish the maximum extended position of movable pad 62 upon movement of shield 12 to separate movable pad 62 from seat bottom 30. Tether guide 74 separates from enlarged head 76 to locate enlarged head 76 in head-motion channel 72 in spaced-apart relation to tether guide 74 upon movement of shield 12 to the lowered position.

Movable pad 62 is formed to include an annular spring-receiver channel 80 as shown, for example, in FIG. 6. Spring 166 includes an upper end 81 arranged to engage portion 165 of shield 12 and a lower end 82 arranged to extend into annular spring-receiver channel 80 to engage a floor 171 on bottom wall 71 of annular spring-receiver channel 80. Spring 166 is coiled to define a central passageway 83 extending therethrough and pad tether 68 is arranged to lie in central passageway 83 as shown, for example, in FIG. 6.

A crotch belt 87 is arranged to extend between seat bottom 30 and hollow barrier 22 as shown, for example, in FIGS. 1, 2, and 4. Each shield lifter unit 14, 16 provides means for applying a lifting force to urge shield 12 away from seat bottom 30 upon movement of shield 12 to the lowered position so that a lifting force is applied by barrier 22 to crotch belt 87 to tension crotch belt 87.

Barrier 22 includes an upwardly facing top wall 20, a downwardly facing left thigh-restraint surface 86 providing means for engaging a left thigh region 26 of a juvenile seated on the seating surface, and a downwardly facing right thigh-restraint surface 84 providing means for engaging a right thigh region 24 of a juvenile seated on the seating surface. Barrier 22 also includes a harness mount 85 interposed between right and left thigh-restraint surfaces 84, 86 and located in a space above downwardly facing right and left thigh-restraint surfaces 84, 86 and below upwardly facing top wall 20. Crotch belt 87 is coupled to harness mount 85 as suggested, for example, in FIG. 4.

Figure 5:
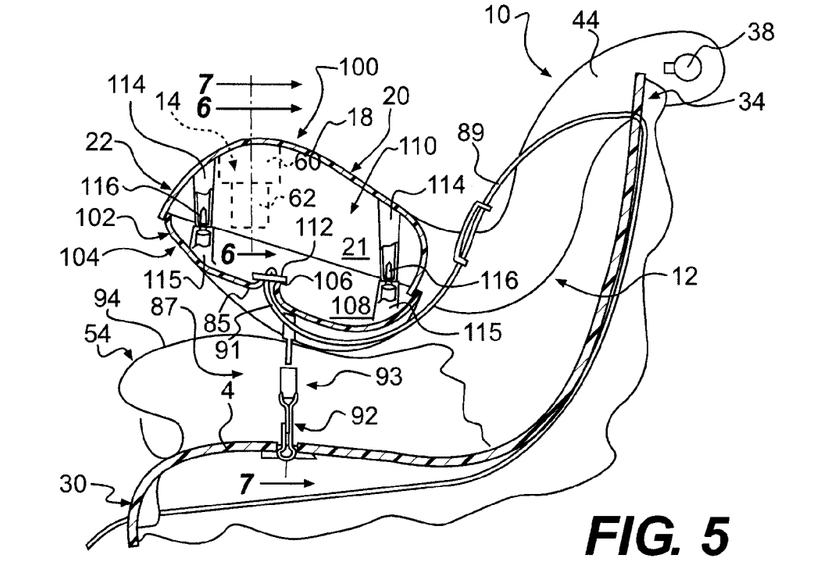
FIG. 5 is a sectional view taken along line 5-5 of FIG. 2 showing (1) a hollow interior region in the "shield" barrier defined by an upper shell mated to a lower shell, (2) use of fasteners to retain downwardly extending barrier posts included in the upper shell in mated relation to upwardly extending barrier posts included in the lower shell, (3) a small slotted plate (providing a crotch belt retainer) located in the hollow interior region of the barrier and coupled to a loop included in the upper strap of the crotch belt and arranged to extend through the belt-receiver slot and into the hollow interior region of the shield barrier to mate with the crotch belt retainer plate, and (4) the compressible shield lifter (in phantom) associated with the right swing arm.

A juvenile-restraint harness 88 is coupled to seat back 34 and to seat bottom 30 as shown, for example, in FIGS. 1, 2, and 5. Juvenile-restraint harness 88 includes a pair of shoulder straps 89, 90, an upper strap 91 coupled to shoulder straps 89, 90 and slidably coupled to harness mount 85 to receive the lifting force applied by barrier 22, and a lower strap 92 (see FIG. 5) coupled to seat bottom 30. Juvenile-restraint harness 88 also includes a buckle 93 interconnecting upper and lower straps 91, 92 and cooperating with upper and lower straps 91, 92 to form the crotch belt 87 that is tensioned by the lifting force applied to barrier 22 by right and left shield lifter units 14, 16.

In an illustrative embodiment shown best in FIG. 4, a compressible shield lifter in accordance with the present disclosure includes a left lifter unit 16 coupled to an underside 165 of shield 12 at a junction 166 between barrier 22 and left swing arm 46 and a right lifter unit 14 coupled to an underside 165 of shield 12 at a junction 164 between barrier 22 and right swing arm 44. Right and left lifter units 14, 16 cooperate to provide means for applying a lifting force to urge shield 12 away from seat bottom 30 upon movement of shield 12 to the lowered position so that a lifting force is applied by barrier 22 to crotch belt 87 to tension crotch belt 87. Left lifter unit 16 is arranged to contact a top surface 96 of left shield support 56 upon movement of shield 12 to assume the lowered position. Right lifter unit 14 is arranged to contact a top surface 94 of right shield support 54 upon movement of shield 12 to assume the lowered position.

Buckle 93 is configured to move from a "buckled" position interconnecting upper and lower straps 91, 92 as suggested in FIGS. 1, 2, and 5 to an "unbuckled" position disconnecting upper and lower straps 91, 92 as suggested in FIG. 4. Shield lifter units 14, 16 provide means for applying a lifting force to urge barrier 22 of shield 12 away from seat bottom 30 to tension the portion of juvenile-restraint harness 88 extending between seat bottom 30 and barrier 22 upon movement of buckle 93 to the buckled position and to increase a separation distance between barrier 22 and seat bottom 30 upon movement of buckle 93 to the unbuckled position.

Hollow barrier 22 includes a downwardly opening upper shell 100 including a top wall 20 and a downwardly extending side wall 21 appended to top wall 20. Hollow barrier 22 also includes an upwardly opening lower shell 102 including a bottom wall 104 formed to include a belt-receiver slot 106 and an upwardly extending side wall 108 appended to bottom wall 104 and arranged to mate with downwardly extending side wall 21 of upper shell 100 to form a hollow interior region 110 in barrier 22.

A crotch belt retainer 112 (defined in the illustrated embodiment by a slotted plate) is located in hollow interior region 110 of barrier 22 as shown, for example, in FIGS. 5 and 7-9. Juvenile-restraint harness 88 includes a pair of shoulder straps 89, 90 coupled to seat back 34 and a crotch belt 87 having a first end coupled to seat bottom 30, an opposite second end coupled to the pair of shoulder straps 89, 90, and a mid-portion configured to carry buckle 93 and located between first and second ends and arranged to extend into hollow interior region 110 of barrier 22 through belt-receiver slot 106 to mate with crotch belt retainer 112.

Lower shell 102 of barrier 22 includes a downwardly facing, concave, left thigh-restraint surface 86 providing means for engaging a left thigh region 126 of a juvenile seated on the seating surface, a downwardly facing, concave, right thigh-restraint surface 84 providing means for engaging a right thigh region 124 of a juvenile seated on the seating surface, and a harness mount 85 interposed between right and left thigh-restraint surfaces 124, 126 and formed to include belt-receiver slot 106. Harness mount 85 includes a ceiling formed to include belt-receiver slot 106 and the ceiling is arranged to lie in a space above right and left thigh-restraint surfaces 124, 126 of lower shell 102 and below top wall 20 of upper shell 100.

Upper shell 100 further includes one or more downwardly extending barrier post 114 located in hollow interior region 110 in close proximity to right swing arm 44 and arranged to extend downwardly toward downwardly facing, concave, right thigh-restraint surface 124 as suggested, for example, in FIGS. 5 and 7. Lower shell 102 further includes one or more upwardly extending barrier post 115 located in hollow interior region 110 and arranged to extend upwardly to mate with one of the downwardly extending barrier posts 114. A fastener 116 is arranged to retain companion upwardly and downwardly extending barrier posts 114, 115 in mated relation to one another to retain upper and lower shells 100, 102 in fixed relation to one another as shown, for example, in FIGS. 5 and 7.

Upper shell 100 further includes one or more downwardly extending left barrier posts 118 located in hollow interior region 110 in close proximity to left swing arm 46. Each downwardly extending right barrier post 114 is located in hollow interior region 110 in close proximity to right swing arm 44 and in laterally spaced-apart relation to a companion left barrier post 118. Unsupported thin-walled section 18 (defining a laterally extending central portion of top wall 20) is located in spaced-apart relation to underlying lower shell 102 and between right and left barrier posts 114, 118 as suggested in FIG. 7.

Lower shell 102 further includes one or more upwardly extending left barrier posts 122 located in hollow interior region 110 and arranged to mate with a companion downwardly extending left barrier post 118 as shown in FIG. 7. A left fastener 120 is coupled to upwardly and downwardly extending left barrier posts 122, 118. Lower shell 102 is coupled to right and left barrier posts 115, 122 to retain upper and lower shells 100, 102 in fixed relation to one another.

The invention claimed is:

1. A juvenile vehicle seat comprising
a seat bottom,
a seat back arranged to extend upwardly from the seat bottom and to cooperate with the seat bottom to provide a seating surface for a juvenile, and
a shield mounted on the seat back for pivotable movement about an axis from a raised position to allow a juvenile to access the seating surface and a lowered position to retain a juvenile contacting the seating surface in a seated position on the seat bottom, the shield including a left swing arm pivotably coupled to a left side of the seat back, a right swing arm pivotably coupled to a right side of the seat back, a barrier arranged to interconnect the left and right swing arms and to lie above a portion of the seating surface included in the seat bottom upon movement of the shield to assume the lowered position, and a compressible shield lifter carried on the shield and arranged to engage the seat bottom upon movement of the shield to assume the lowered position.

2. The seat of claim 1, wherein the compressible shield lifter includes a pad receiver coupled to the shield, a movable pad mounted on the pad receiver for movement toward and away from the shield and arranged to engage the seat bottom upon movement of the shield to assume the lowered position, and a cushion system interposed between the pad receiver and the movable pad.

3. The seat of claim 2, wherein the pad receiver is formed to include a downwardly opening interior region and the movable pad is telescopically received in the downwardly opening interior region.

4. The seat of claim 3, wherein the pad receiver and the movable pad are arranged to remain in mating engagement with one another during relative motion of the movable pad and the pad receiver.

5. The seat of claim 3, wherein the cushion system includes a compression spring arranged to extend into the downwardly opening interior region and urge the movable pad in a direction away from the shield.

6. The seat of claim 3, wherein the cushion system includes a pad tether coupled to the shield and to the movable pad and configured to limit movement of the movable pad relative to the shield and to the pad receiver to a maximum extended position.

7. The seat of claim 2, wherein the cushion system includes a pad tether coupled to the shield and to the movable pad and configured to limit movement of the movable pad relative to the shield and to the pad receiver to a maximum extended position and the cushion system also includes a compressible spring interposed between the shield and the movable pad and arranged yieldably to urge the movable pad normally to the maximum extended position.

8. The seat of claim 7, wherein the seat bottom includes left and right shield supports arranged to lie in spaced-apart relation to one another to locate the portion of the seating surface included in the seat bottom therebetween and to extend upwardly away from said portion of the seating surface, and the movable pad is arranged to engage one of the left and right shield supports upon movement of the shield to assume the lowered position.

9. The seat of claim 7, wherein the shield includes a tether anchor arranged to lie in spaced-apart relation to the movable pad, the movable pad is formed to include a bottom wall, a head-motion channel having an opening in the bottom wall, and a tether guide located between the bottom wall and the tether anchor and formed to include a tether-receiver aperture, and the pad tether includes an enlarged head lying in the head-motion channel and a shank extending through the tether-receiver aperture and having one end fixed to the tether anchor and another end coupled to the enlarged head, and wherein the tether guide contacts the enlarged head to establish the maximum extended position of the movable pad upon movement of the shield to separate the movable pad from the seat bottom and the tether guide separates from the enlarged head to locate the enlarged head in the head-motion channel in spaced-apart relation to the tether guide upon movement of the shield to the lowered position.

10. The seat of claim 7, wherein the movable pad is formed to include an annular spring-receiver channel and the compressible spring includes an upper end arranged to engage the shield and a lower end arranged to extend into the annular spring-receiver channel to engage a floor of the annular spring-receiver channel.

11. The seat of claim 10, wherein the compressible spring is coiled to define a central passageway extending therethrough and the pad tether is arranged to lie in the central passageway.

12. The seat of claim 1, wherein the seat bottom includes left and right shield supports arranged to lie in spaced-apart relation to one another to locate the portion of the seating surface included in the seat bottom therebetween and to extend upwardly away from said portion of the seating surface, and a movable pad is arranged to engage one of the left and right shield supports upon movement of the shield to assume the lowered position.

13. The seat of claim 12, further comprising an auxiliary compressible shield lifter carried on the shield and arranged to engage the other of the left and right shield supports upon movement of the shield to assume the lowered position.

14. The seat of claim 1, further comprising a crotch belt arranged to extend between and coupled to the seat bottom and the barrier and the compressible shield lifter provides means for applying a lifting force to urge the shield away from the seat bottom upon movement of the shield to the lowered position so that a lifting force is applied by the barrier to the crotch belt to tension the crotch belt.

15. The seat of claim 14, wherein the barrier includes an upwardly facing top wall, a downwardly facing left thigh-restraint surface providing means for engaging a left thigh region of a juvenile when seated on the seating surface, a downwardly facing right thigh-restraint surface providing means for engaging a right thigh region of a juvenile seated on the seating surface, and a harness mount interposed between the left and right thigh-restraint surfaces and located in a space above the downwardly facing left and right thigh-restraint surfaces and below the upwardly facing top wall and wherein the crotch belt is coupled to the harness mount.

16. The seat of claim 15, further comprising a juvenile-restraint harness coupled to the seat back and to the seat bottom, the juvenile-restraint harness comprising a pair of shoulder straps, an upper strap coupled to the pair of shoulder straps and slidably coupled to the harness mount to receive the lifting force applied by the barrier, a lower strap coupled to the seat bottom, a buckle interconnecting the upper and lower straps and cooperating with the upper and lower straps to form the crotch belt that is tensioned by the lifting force applied to the barrier by the compressible shield lifter.

17. The seat of claim 14, wherein the compressible shield lifter comprises a left lifter unit coupled to an underside of the shield at a junction between the barrier and the left swing arm and a right lifter unit coupled to an underside of the shield at a junction between the barrier and the right swing arm and wherein the left and right lifter units cooperate to provide means for applying a lifting force to urge the shield away from the seat bottom upon movement of the shield to the lowered position so that a lifting force is applied by the barrier to the crotch belt to tension the crotch belt.

18. The seat of claim 17, further comprising a juvenile-restraint harness coupled to the seat back arid to the seat bottom, the juvenile-restraint harness comprising a pair of shoulder straps, an upper strap coupled to the pair of shoulder straps and slidably coupled to the barrier to receive the lifting force applied by the barrier, a lower strap coupled to the seat bottom, a buckle interconnecting the upper and lower straps and cooperating with the upper and lower straps to form the crotch belt that is tensioned by the lifting force applied to the barrier by the left and right lifter units of the compressible shield lifter.

19. The seat of claim 17, wherein the seat bottom includes left and right shield supports arranged to lie in spaced-apart relation to one another to locate the portion of the seating surface included in the seat bottom therebetween and to extend upwardly away from said portion of the seating surface, the left lifter unit is arranged to contact a top surface of the left shield support upon movement of the shield to assume the lowered position, and the right lifter unit is arranged to contact a top surface of the right shield support upon movement of the shield to assume the lowered position.

20. The seat of claim 1, further comprising a juvenile-restraint harness coupled to the seat back, barrier, and seat bottom, and wherein a portion of the juvenile-restraint harness extends between the seat bottom and the barrier to define a crotch belt including an upper strap coupled to the barrier, a lower strap coupled to the seat bottom, and a buckle configured to move from a buckled position to interconnect the upper and lower straps to an unbuckled position to disconnect the upper and lower straps, and wherein the compressible shield lifter provides means for applying a lifting force to urge the barrier of the shield away from the seat bottom to tension the portion of the juvenile-restraint harness extending between the seat bottom and the barrier upon movement of the buckle to the buckled position and to increase a separation distance between the barrier and the seat bottom upon movement of the buckle to the unbuckled position.

21. A juvenile vehicle seat comprising
a seat bottom,
a seat back arranged to extend upwardly from the seat bottom and to cooperate with the seat bottom to provide a seating surface for a juvenile,
a shield mounted on the seat back for pivotable movement about an axis from a raised position to allow a juvenile to access the seating surface and a lowered position to retain a juvenile contacting the seating surface in a seated position on the seat bottom, the shield including a left swing arm pivotably coupled to a left side of the seat back, a right swing arm pivotably coupled to a right side of the seat back, and a barrier arranged to interconnect the left and right swing arms arid to lie above a portion of the seating surface included in the seat bottom upon movement of the shield to assume the lowered position, the barrier including a downwardly opening upper shell including a top wall and a downwardly extending side wall appended to the top wall and an upwardly opening lower shell including a bottom wall formed to include a belt-receiver slot and an upwardly extending side wall appended to the bottom wall and arranged to mate with the downwardly extending side wall of the upper shell to form a hollow interior region in the barrier, a crotch belt retainer located in the hollow interior region of the barrier, and a juvenile-restraint harness including a pair of shoulder straps coupled to the seat back and a crotch belt having a first end coupled to the seat bottom, an opposite second end coupled to the pair of shoulder straps, and a mid-portion configured to carry a buckle and located between the first and second ends and arranged to extend into the hollow interior region of the barrier through the belt-receiver slot to mate with the crotch belt retainer.

22. The seat of claim 21, wherein the lower shell of the barrier includes a downwardly facing, concave, left thigh-restraint surface providing means for engaging a left thigh region of a juvenile when seated on the seating surface, a downwardly facing, concave, right thigh-restraint surface providing means for engaging a right thigh region of a juvenile seated on the seating surface, and a harness mount interposed between the left and right thigh-restraint surfaces and formed to include the belt-receiver slot.

23. The seat of claim 22, wherein the harness mount includes a ceiling formed to include the belt-receiver slot and the ceiling is arranged to lie in a space above the left and right thigh-restraint surfaces of the lower shell and below the top wall of the upper shell.

24. The seat of claim 22, wherein the upper shell further includes a downwardly extending barrier post located in the hollow interior region and arranged to extend downwardly toward one of the downwardly facing, concave, left and right thigh-restraint surfaces, the lower shell further includes an upwardly extending barrier post located in the hollow interior region and arranged to extend upwardly to mate with the downwardly extending barrier post, and wherein the shield further includes a fastener arranged to retain the upwardly and downwardly extending barrier posts in mated relation to one another to retain the upper and lower shells in fixed relation to one another.

25. The seat of claim 22, wherein the upper shell further includes a downwardly extending left barrier post located in the hollow interior region in close proximity to the left swing arm, a downwardly extending right barrier post located in the hollow interior region in close proximity to the right swing arm and in laterally spaced-apart relation to the left barrier post, and an unsupported thin-walled section defining a laterally extending central portion of the top wall located in spaced-apart relation to the lower shell and between the left and right barrier posts and the lower shell is coupled to the left and right barrier posts to retain the upper and lower shells in fixed relation to one another.

26. The seat of claim 25, wherein the lower shell further includes an upwardly extending left barrier post located in the hollow interior region and arranged to mate with the downwardly extending left barrier post and an upwardly extending right barrier post located in the hollow interior region and arranged to mate with the downwardly extending right barrier post, and wherein the shield further includes a left fastener coupled to the upwardly and downwardly extending left barrier posts and a right fastener coupled to the upwardly and downwardly extending right barrier posts to retain the upper and lower shells in fixed relation to one another.

27. The seat of claim 25, wherein the belt-receiver slot is formed in a section of the bottom wall of the lower shell underlying the unsupported thin-walled section defining a laterally extending central portion of the top wall of the upper shell.

28. A juvenile vehicle seat comprising
a seat bottom,
a seat back arranged to extend upwardly from the seat bottom and to cooperate with the seat bottom to provide a seating surface for a juvenile, and
a shield mounted on the seat back for pivotable movement about an axis from a raised position to allow a juvenile access to the seating surface and a lowered position to retain a juvenile contacting the seating surface in a seated position on the seat bottom, the shield including a left swing arm pivotably coupled to a left side of the seat back, a right swing arm pivotably coupled to a right side of the seat back, and a barrier arranged to interconnect the left and right swing arms and to lie above a portion of the seating surface included in the seat bottom upon movement of the shield to assume the lowered position, the barrier including a downwardly opening upper shell including a top wall and a downwardly extending side wall appended to the top wall and an upwardly opening lower shell including a bottom wall formed to include a belt-receiver slot and an upwardly extending side wall appended to the bottom wall and arranged to mate with the downwardly extending side wall of the upper shell to form a hollow interior region in the barrier, wherein the upper shell further includes a downwardly extending left barrier post located in the hollow interior region in close proximity to the left swing arm, a downwardly extending right barrier post located in the hollow interior region in close proximity to the right swing arm and in laterally spaced-apart relation to the left barrier post, and an unsupported thin-walled section defining a laterally extending central portion of the top wall located in spaced-apart relation to the lower shell and between the left and right barrier posts and the lower shell is coupled to the left and right barrier posts to retain the upper and lower shells in fixed relation to one another.

29. The seat of claim 28, wherein the lower shell further includes an upwardly extending left barrier post located in the hollow interior region and arranged to mate with the downwardly extending left barrier post and an upwardly extending right barrier post located in the hollow interior region and arranged to mate with the downwardly extending right barrier post, and wherein the shield further includes a left fastener coupled to the upwardly and downwardly extending left barrier posts and a right fastener coupled to the upwardly and downwardly extending right barrier posts to retain the upper and lower shells in fixed relation to one another.

30. The seat of claim 28, further comprising a crotch belt retainer located in the hollow interior region of the barrier, a juvenile-restraint harness including a pair of shoulder straps coupled-to the seat back and a crotch belt having a first end coupled-to the seat bottom, an opposite second end coupled to the pair of shoulder straps, and a mid-portion configured to carry a buckle and located between the first and second ends and arranged to extend into the hollow interior region of the barrier through the belt-receiver slot to mate with the crotch belt retainer, wherein the belt-receiver slot is formed in a section of the bottom wall of the lower shell underlying the unsupported thin-walled section defining a laterally extending central portion of the top wall of the upper shell.

* * * * *